Figure 1:
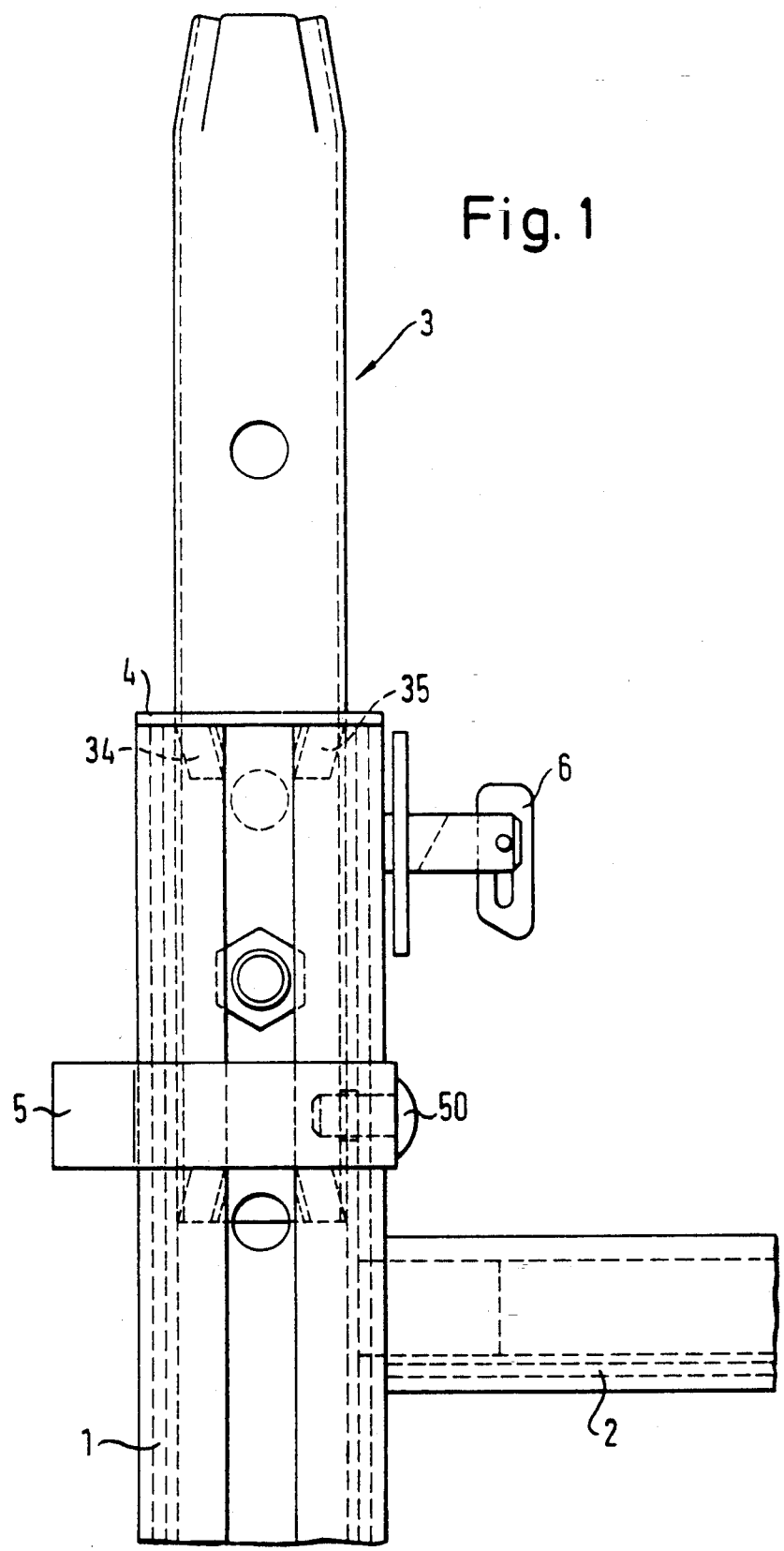

United States Patent [19]
Röck

[11] Patent Number: 5,285,869
[45] Date of Patent: Feb. 15, 1994

[54] SCAFFOLDING FRAME TO WHICH A STORY CAN BE ADDED

[75] Inventor: Ernst Röck, Amstetten, Austria

[73] Assignee: Osterreichischi doka Schalungstechnik GmbH, Amstetten, Austria

[21] Appl. No.: 880,226

[22] Filed: May 8, 1992

[30] Foreign Application Priority Data

May 15, 1991 [DE] Fed. Rep. of Germany ....... 9106022

[51] Int. Cl.$^5$ ................................................ E04G 7/00
[52] U.S. Cl. .................................. 182/178; 403/196; 403/373; 403/378
[58] Field of Search ............... 182/178, 207, 209, 151; 52/637; 248/354.5; 403/196, 194, 292, 373, 376, 378

[56] References Cited

U.S. PATENT DOCUMENTS

| | | | |
|---|---|---|---|
| 2,473,388 | 6/1949 | Rambo | 182/178 X |
| 4,015,395 | 4/1977 | Gostling | 182/178 X |
| 4,586,844 | 5/1986 | Hammonds et al. | 182/178 X |
| 4,830,144 | 5/1989 | Werner | 182/178 |
| 4,949,525 | 8/1990 | Weaver | 403/292 X |
| 5,022,777 | 6/1991 | Kolvites | 403/292 X |
| 5,069,309 | 12/1991 | Swiderski et al. | 182/178 X |

FOREIGN PATENT DOCUMENTS

| | | |
|---|---|---|
| 2480837 | 10/1981 | France . |
| 29383 | 7/1964 | German Democratic Rep. ..... 182/178 |
| 3081991 | 8/1991 | Japan .................. 403/292 |
| 8300154 | 11/1983 | PCT Int'l Appl. . |
| 1600019 | 10/1981 | United Kingdom . |
| 2189566 | 10/1987 | United Kingdom . |

Primary Examiner—Karen J. Chotkowski
Attorney, Agent, or Firm—James J. Ralabate

[57] ABSTRACT

A scaffolding frame to which a story can be added, comprising vertical stands which are formed as hollow sections, horizontal struts which are secured to the vertical stands, and at least one joining sleeve which is inserted into a vertical stand and can be set at a specific height by means of a safety bolt which is inserted through an opening provided in the side wall of the joining sleeve and an opening in the vertical stand which is in alignment with the opening in the joining sleeve, the scaffolding frame being characterized in that the joining sleeve has radially extending peripheral expansions on its side wall, that the vertical stand is provided at each of its ends with a section end serving as a stop for such peripheral expansions, each section end covering the cross sectional opening of the section of the vertical stand in a circular ring-shaped form and the inner circular diameter of the section end corresponding to the outer diameter of the joining sleeve without peripheral expansions, and that the safety bolt is provided with a U-shaped spring (5, 51) surrounding the vertical stand, the spring holding the safety bolt in its position in the vertical stand in which it engages the openings of the vertical stand and the joining sleeve.

10 Claims, 6 Drawing Sheets

SCAFFOLDING FRAME TO WHICH A STORY CAN BE ADDED

The invention relates to a scaffolding frame to which a story can be added, comprising vertical stands formed as hollow sections, joining struts which are secured to the vertical stands, and at least one joining sleeve which is inserted into a vertical stand and can be set at a certain height by means of a safety bolt, the safety bolt being inserted through an opening provided in the peripheral wall of the joining sleeve and an opening in the vertical stand which is aligned with the opening in the joining sleeve.

Such scaffolding frames are used, for example, to be able to build the required supporting scaffolding in a supporting structure for ceiling forms consisting of individual parts. The joining sleeves serving as coupling pieces are inserted into the vertical stand of a base frame and fixed in such a manner that a part of the joining sleeve projects out of the vertical stand in order to be able to mount a further vertical stand thereon. For fixing the joining sleeves, sprung bolts are used, for example, which are inserted through the aligned openings in the joining sleeve and the vertical stand. A curved spring clip fastened to the side of the bolt partially surrounds the vertical stand and in this manner prevents loss of the bolt by mistake or also through vibrations of the frame work.

For fixing drop connectors are also applied in which, on an oblong bolt inserted through the openings in the joining sleeve and the vertical stand, a heavy section is provided which lies against the outer surface of the vertical stand and partially surrounds this, the section holding the drop connector in its position through of its own weight.

Generally, each frame part is secured by means of a separate bolt or connector. However, a so-called double tapered bolt can be used which simultaneously holds two respectively adjacent frame parts. The bolts projecting through the openings are often additionally secured by means of a sprung safety pin, wire or nail which is inserted through a bore in the end section of the bolt. Further safety measures for bolts consist of pins pivotable out of the bolts which are brought into a vertical position and thus hinder the movement of the bolt, or of shoulders arranged on the bolts, the resistance of which must be overcome when inserting the bolts.

In order to at all overcome the problem of loseable bolts, a joining sleeve has been used which is chamfered in the upper region and has a projection which engages in a corresponding opening in the vertical stand when this is placed at an angle on the joining sleeve of the lower vertical stand and erected.

A further joining sleeve effects the locking by means of a simple rotation of the stand.

Finally, seperate joining sleeves are also known which are attached to the vertical stand and also support the second scaffold.

A disadvantage lies in the scaffolding frames to which a story can be added in that a plurality of components is required, the risk always being present that these components are lost.

It is therefore the object of the invention to provide a scaffolding frame to which a story can be added in which all components are unlosable so that the parts necesssary for the construction scaffold are always available.

This object is solved by a scaffolding frame to which a story can be added of the type initially mentioned having the features of claim 1.

Advantageous embodiments are the subject matter of the dependant claims.

According to a particularly preferred embodiment, the joining sleeve has a first set of radially extending peripheral expansions in the form of projections at its peripheral wall in a first end section and, axially spaced therefrom, a second set of radially extending projections. Furthermore, the vertical stand is provided at each of its ends with a section end serving as a stop for such projections, each section end covering the section opening in a circular ring-shaped manner and corresponding in its inner circular diameter to the outer diameter of the joining sleeve without projections. Additionally, the safety bolt is provided with a spring which holds the safety bolt in position on the vertical stand in which it is engaged in the openings of the vertical stand and the joining sleeve.

The joining sleeve is always held within the vertical stand and necessarily pulled out of the vertical stand up to the stop of the second set of radially extending projections. In the stop position, the securing ensues by means of the safety bolt. This is held on the vertical stand by the spring. Thus, all the necessary parts for adding a story are as a whole unloseably connected with the scaffolding frame, i.e. the respective vertical stand. The first set of projections completely hold the joining sleeve at the lower end of the vertical stand in its interior. Thus, without hinderence, a threaded spindle for setting up the scaffold can be added at the lower end of the vertical strut. By releasing the safety bolt and inserting the joining sleeve in the vertical section, a spindle or similar can also be inserted from the second side.

The joining sleeve is advantageously frustrum-shaped at the second end section, on account of which the mounting of a further vertical stand is simplified.

It has also proven to be sufficient if the first set of projections as well as the second set of projections respectively include two mutually opposed wings.

For specifically designed vertical stands with suitable internal sections, the wings can serve as guides for the joining sleeve in the vertical stand when they are aligned with each other in the axial direction of the joining sleeve.

The spring which secures the safety bolt can include a U-shape in the region opposite the safety bolt, the greatest distance of the U-shape from the outer periphery of the vertical stand being substantially the same as the length of the safety bolt. The safety bolt can therefore be moved out of its locking position in that pressure is applied to the U-shape until this itself hits against the vertical stand.

The joining sleeve can be inserted into the vertical stand in such a manner that its second end region upon which the further scaffold should be placed projects either out of the upper or the lower end of the vertical stand.

The appropriate arrangement of the joining sleeve being assumed basically every scaffolding frame of the present invention can therefore carry a further scaffolding frame or be placed onto a scaffolding frame. A respective section end-piece at the lower or the upper section end prevents the joining sleeve from falling out of the vertical stand. The section end can also simultaneously form a bearing surface. Thus, at each end of the respective vertical strut, a setting spindle can be easily mounted and handled with little expenditure of force. Simultaneously, the edge region of the vertical stand is protected from damage by means of the section endpiece.

Figure 2A:
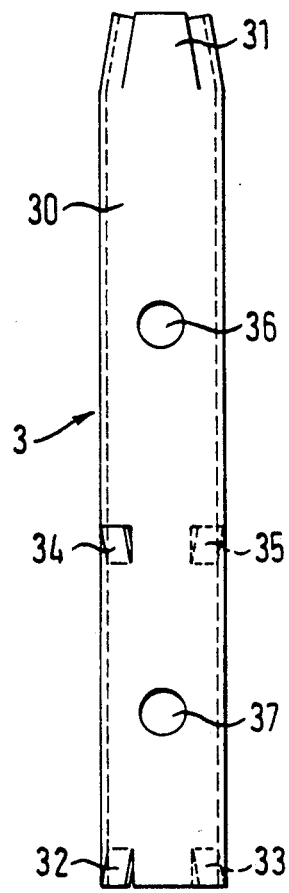
Figure 2B:
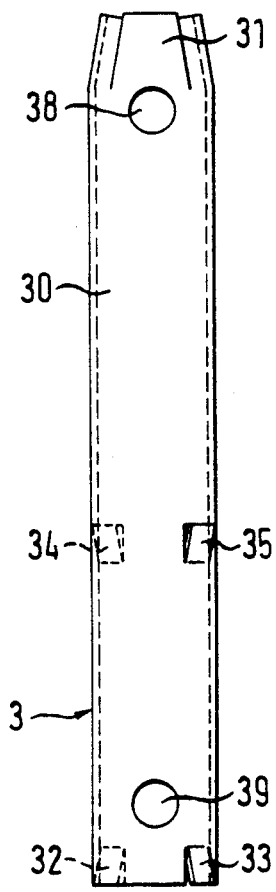
Figure 2C:
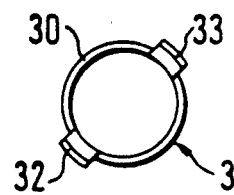
Figure 3A:
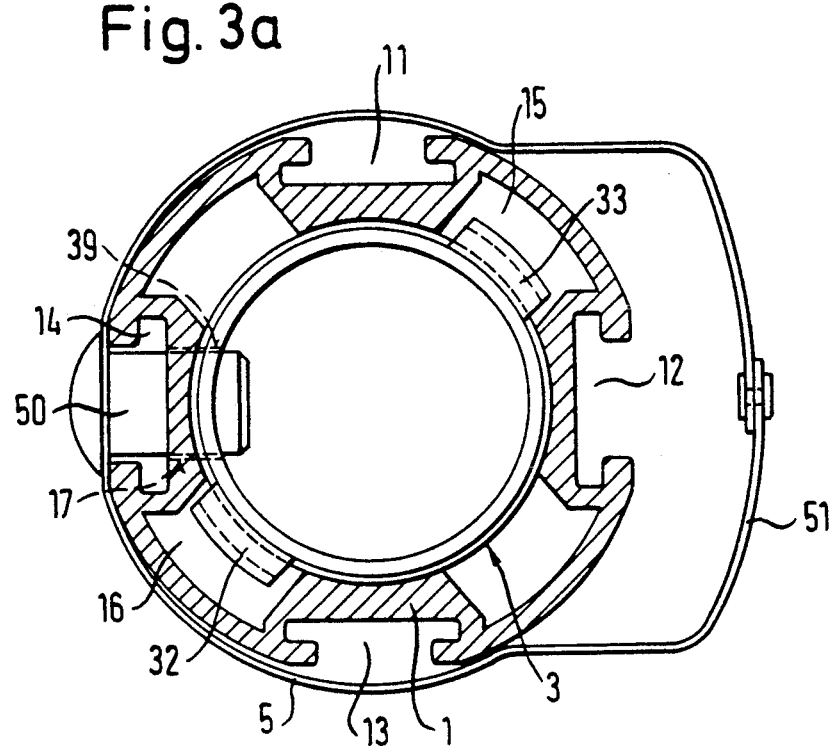
Figure 3B:
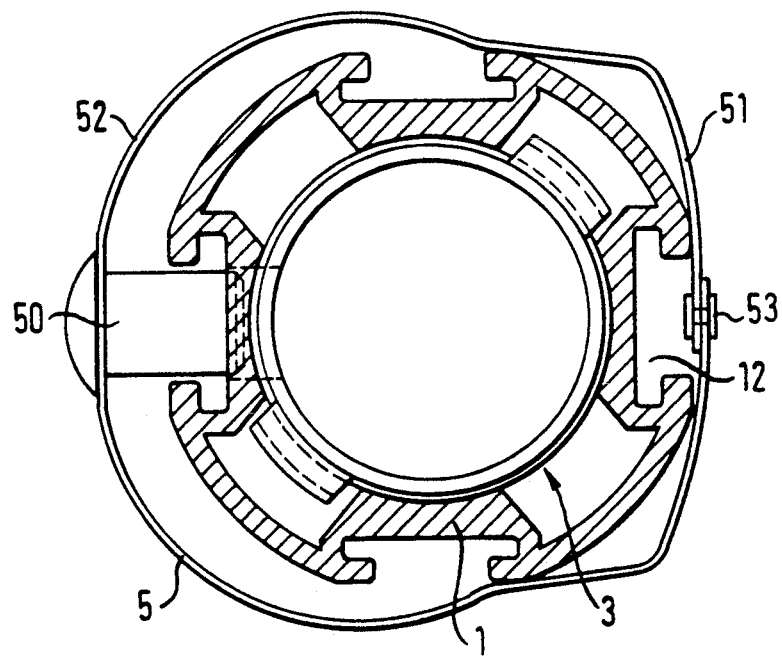
Figure 4:
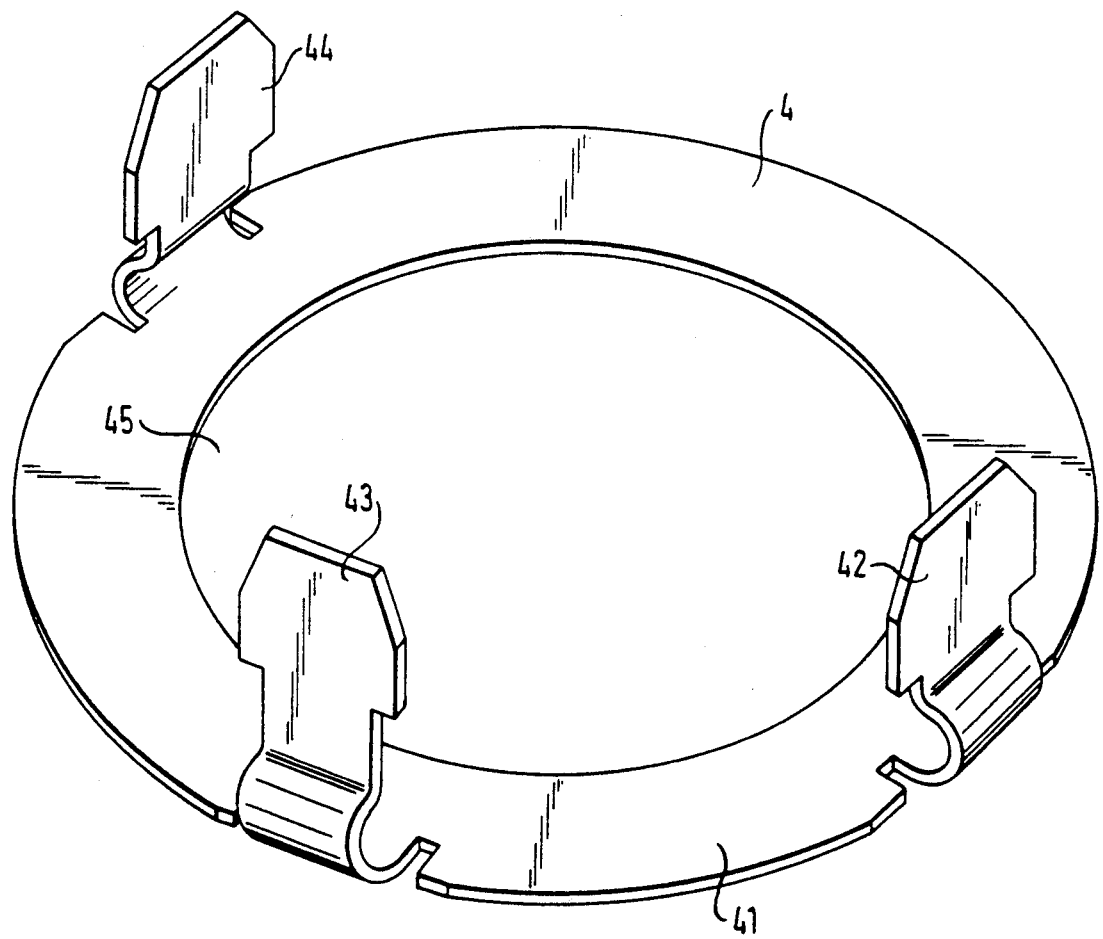
Figure 5A:
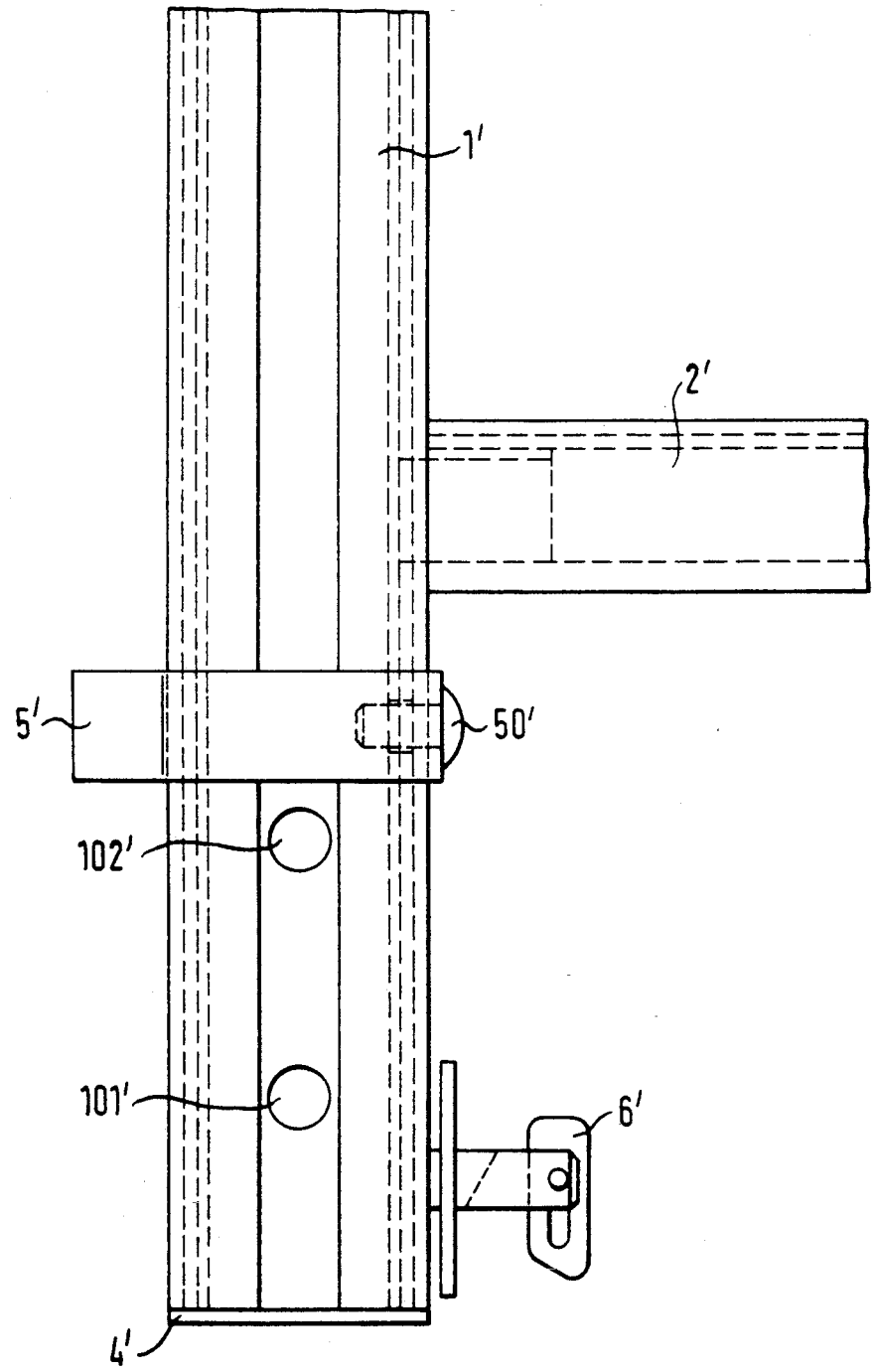
Figure 5B:
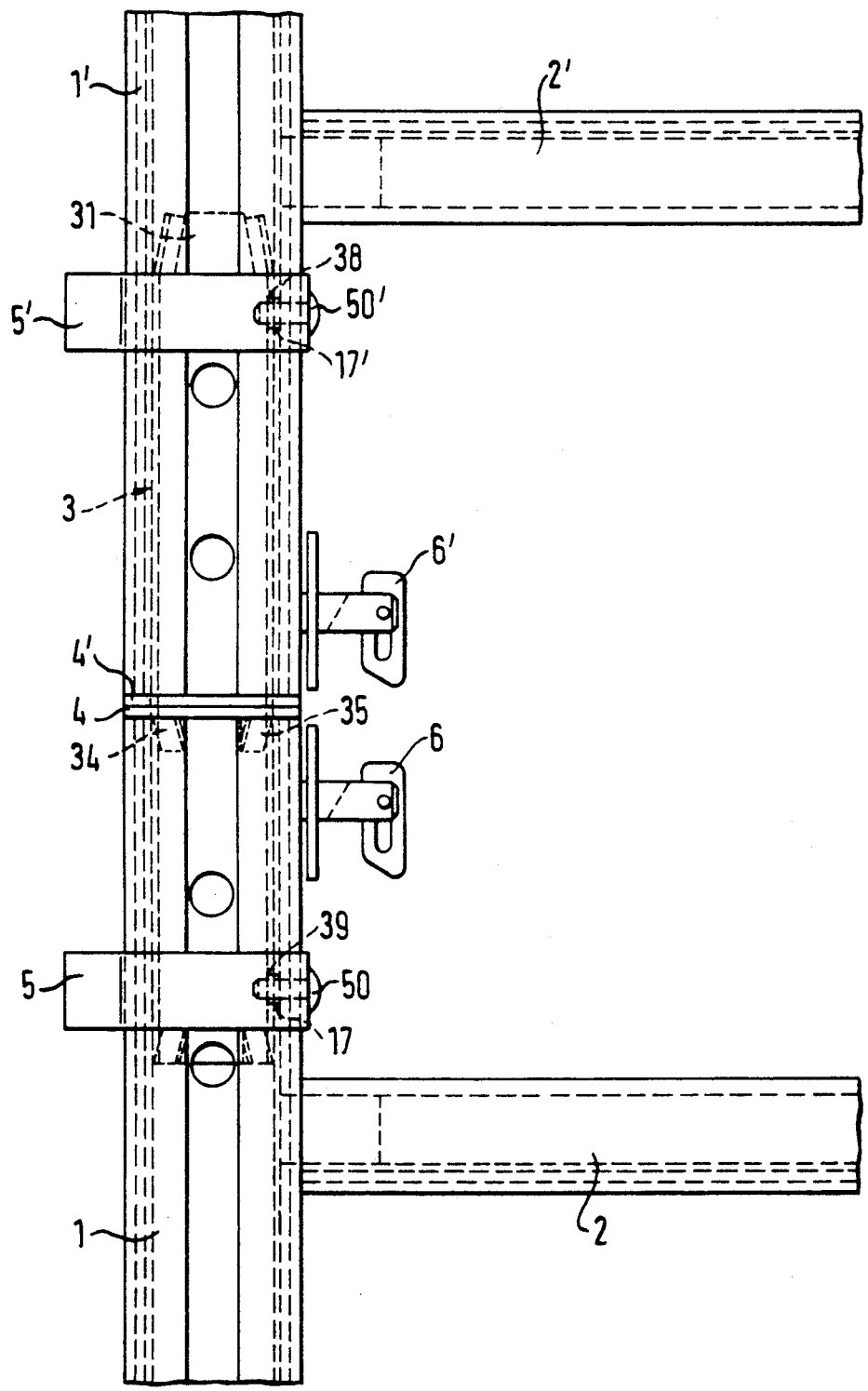

In the following, the invention is described in more detail merely as an example with reference to the drawings, in which:

FIG. 1 shows a view of an inventive scaffolding frame in the region of the joining position for a further scaffolding frame, FIG. 2a shows a detailed view of the joining sleeve in side view, FIG. 2b shows a side view of the joining sleeve of FIG. 2a rotated 180° about the longitudinal axis, FIG. 2c shows a view of the joining sleeve from below, FIG. 3a shows a cross section of view of the vertical stand with the joining sleeve in the region of the safety bolt having a spring, the safety bolt being engaged, FIG. 3b shows a cross section of view corresponding to FIG. 3a with a disengaged safety bolt, FIG. 4 shows an inclined elevation of the section endpiece, FIG. 5a shows a partial view of a mounted scaffolding frame in the region of the joining position, and view of two scaffolding frames, FIG. 5b shows a partial view of two scaffolding frames, one mounted on the other.

FIG. 1 shows the upper region of a vertical stand 1, to the upper end of which a section end 4 is mounted. A joining sleeve 3, which is inserted into the vertical stand 1, can only be pulled to the extent out of the vertical stand 1 that the wings 34, 35 forming the peripheral extensions of the joining sleeve come to lie against the lower side of the section end 4. In this position, the joining sleeve 3 is held by a safety bolt 0, which itself is unloseably attached to the vertical stand by a spring 5 surrounding the vertical stand 1. A horizontal strut 2 is connected to the vertical stand 1 at a height which, together with a further horizontal and a further vertical strut, forms a scaffolding frame.

The joining sleeve 3 is described in detail with the set of FIGS. 2. FIG. 2a shows a side view of the joining sleeve 3 which consists of a hollow cylindrical sleeve body 30 comprising a frustrum-shaped upper end section 31. This end section 31 can, for example, be formed by folding. In the lower end section of the sleeve body 30, two mutually opposing wings 32, 33 are stamped out and bend outwardly in such a manner that each wing forms a radially extending projection. The wings prevent a partial slipping of the joining sleeve 3 out of the lower end of the vertical stand, which is desirable for some application purposes. Axially spaced from these wings and approximately in the middle region of the joining sleeve 3, two further wings 34, 35 are provided which are also stamped out and formed in such a manner that they form the required projections of the joining sleeve 3 for support on the section end 4. For this, the wings 32, 33 open downwardly, and the wings 34, 35 upwardly. Respectively two of the wings 32, 34 or 33, 35 are aligned with respect to one another in the axial direction of the joining sleeve 3. Approximately in the center between the wing pairs 32, 33 and 34, 35, an opening 37 is provided. A second opening 36 is located above the wings 34, 35. The openings 36, 37 are also aligned with one another in the axial direction of the joining sleeve 3. These can be brought into alignment with the openings in the vertical stand 1 and used to set the height of the joining sleeve 3.

FIG. 2b is a side view of the joining sleeve 3 of FIG. 2a rotated about 180°. Beneath the frustrum-shaped end section 31, a third opening 38 is provided in the sleeve body 30 which is aligned with a fourth opening 39 in the axial direction of the joining sleeve 3, the fourth opening being provided at the lower end of the sleeve body 30 adjacent the wings 32, 33. The openings 38, 39 particularly serve to set the height of the joining sleeve 3 and to secure a mounted scaffolding frame.

FIG. 2c shows a view of the joining sleeve 3 from below, wherein it can be recognised that the wings 32, 33 are arranged mutually opposite one another.

FIG. 3 clearly shows the cooperation between safety bolt 50, spring 5 and joining sleeve 3 with a vertical stand 1 which is sectioned in a specific manner. The vertical stand 1 has on its outer periphery four rails 11, 12, 13, 14 extending in the axial direction into which additional parts for the scaffolding, for example coupling pieces or the like can be inserted. These rails, which are respectively spaced from one another at an angular distance of 90°, are worked into the hollow section of the vertical stand 1 in such a manner that a longitudinal recess is formed between rails 11, 12 or 12, 13 etc. at the inner side of the vertical stand 1. Into two of these longitudinal recesses 15, 16 which lie opposite one another, the wings 32, 33 (or 34, 35) of the joining sleeve 3 project such that the joining sleeve 3 is slideably guided in the vertical stand 1 and secured against rotation.

In FIG. 3a, the safety bolt 50 is arranged in the region of the rail 14 and engages through the aligned openings 17, 39 respectively in the vertical stand 1 and the joining sleeve 3. The safety bolt is secured to a spring 5 which surrounds the vertical stand 1 about approximately ¾ of its periphery and goes over into a U-shape 51 which is arranged opposite the safety bolt 50. The safety bolt 50 is held in its locking position by means of the force of the spring 5.

FIG. 3b shows the position of the spring 5 for disenganging the safety bolt 50. The U-shape 51 is pushed against the vertical stand 1 until it lies against this in the region of the rail 12. Thus, the circular region 52 of the spring 5 moves away from the vertical stand 1 so that the safety bolt 50, which is moved together with the spring 5, releases the joining sleeve 3 but does not leave the opening 17 of the vertical stand and can therefore not be displaced vertically in the vertical stand in the non-engaged position. On the basis of the largest distance of the holder 51 to the vertical stand 1, it is determined how far the safety bolt 50 is moved. This larger distance, which is necessary in order to be able to completely move the safety bolt out of the engaged position, depends on the structural features of the vertical stand and must be suitably adapted. The U-shape 51 in this exemplified embodiment is formed itself by the two opposing end sections of the spring, the ends being connected to one another by means of a rivet, pin or screw. This connection point 53 can also be formed in such a manner that the tension of the spring 5 can be adjusted by this. Thus, for example, oblong holes can be provided in the overlapping ends so that the relative position of these end sections can be selectively set.

FIG. 4 shows an embodiment of a section end which prevents the sliding of the joining sleeve 3 out of the vertical stand, although the connecting sleeve 3 can project through this so that a further vertical stand can be joined thereto. Thus, the section end 4 is essentially circular. The inner diameter of the opening 45 corresponds in this case to the outer diameter of the joining sleeve 3 without the projections 32 to 35. The ring-shaped section 41 of the section end continues in the form of three tongues 42, 43, 44 which expand in a T-shaped manner at the ends thereof. In mounting, the tongues 42, 43, 44 reach into three of the four axially extending rails 11, 12, 13, 14 of the vertical stand 1. The section end 4 is mounted after insertion of the joining sleeve 3 by being pushed into the vertical stand 1 and secured against falling out through suitable measures such as pressing or by screws. FIG. 5a shows a partial section of a scaffolding frame to be mounted in the region of a joining position. At the lower end of the vertical stand 1', a section end 4' such as described with respect to FIG. 4 is provided. In the direct vicinity of the section end 4', a self-securing catch 6' is located in the lower region of the vertical stand 1'. Furthermore, two openings 101', 102' aligned in the axial direction are provided which in any case align with corresponding openings in a joining sleeve. A safety bolt 50' with a spring 5' is provided above the second opening 102' and a horizontal strut 2' is provided further above this.

FIG. 5b shows this scaffolding frame mounted on a scaffolding frame according to FIG. 1. The joining sleeve 3 is pulled to such an extent out of the lower vertical stand 1 that the wings 34, 35 come to lie against the section end 4. In this position, the joining sleeve 3 is fixed in the lower vertical stand 1 by means of the safety bolt 50, which engages through the openings 17, 39 respectively in the vertical stand 1 and the joining sleeve 3. The upper vertical stand 1' is provided at its lower end with a section end 4' through which the joining sleeve 3 is inserted into the upper vertical stand 1'. The frustrum-shaped form of the end section 31 of the joining sleeve 3 simplifies the mounting in this case. The joining sleeve 3 is secured to the upper vertical stand 1' by means of its safety bolt 50' which engages through openings 17', 38 respectively of the upper vertical stand 1' and the joining sleeve 3. Both safety bolts 50, 50' are held by means of the correspondingly provided springs 5, 5'. The entire coupling device for both scaffolding frames lies between the horizontal struts 2, 2' of the scaffolding frames.

By means of the invention, a simply handleable scaffolding frame to which a story can be added is made available, all parts of which are connected to one another so as not to be lost. The joining sleeve can be pushed entirely into the inside of the vertical stand so that a spindle for evening out the height of the scaffolding can be inserted into the vertical stand without problems.

What is claimed is:

1. A scaffolding frame to which a story can be added comprising vertical stands which are formed as hollow sections, at least one joining sleeve which is inserted into a vertical stand, the joining sleeve having at least one peripheral expansion at its peripheral wall, and at least one safety bolt to set the joining sleeve at a specific height versus the vertical stand by being inserted through an opening provided in the peripheral wall of the joining sleeve and an opening in the vertical stand which is in alignment with the opening in the joining sleeve, characterized in that the vertical stand is provided with an inner cross section being adapted to slidably enclose the outer cross section of the joining sleeve including its at least one peripheral expansion, the vertical stand is further provided at its ends with a stop, respectively, for interaction with the at least one peripheral expansion of the joining sleeve to prevent the joining sleeve from being moved further out of the vertical stand beyond the position when the at least one peripheral expansion engages the stop, each stop having a circular ring-shaped form to cover an outer part of the cross section area of the vertical stand, the inner circular diameter of the stop substantially corresponding to the outer circular diameter of the joining sleeve without peripheral expansions, and the safety bolt is provided with a U-shape enclosing the vertical stand in a plane substantially perpendicular to the longitudinal axis of the vertical stand, the U-shape being movable in direction of the axis of the safety bolt to take either one of two positions, in each of said positions the U-shape being clung to the vertical stand by a portion of its circumference acting as a clamp, one of the positions corresponding to the safety bolt being engaged in the openings of both the vertical stand and the joining sleeve, the other position corresponding to the safety bolt being engaged in the opening of the vertical stand without engaging the opening of the joining sleeve, thereby the safety bolt always being secured to the vertical stand in alignment with the opening thereof.

2. Scaffolding frame according to claim 1 characterized in that the joining sleeve is frustrum-shaped at its second end section.

3. Scaffolding frame according to claim 1 or 2 characterized in that a first set of projections forming the peripheral expansions includes two mutually opposed wings.

4. Scaffolding frame according to claim 1 characterized in that a second set of projections forming the peripheral expansions includes two mutually opposed wings.

5. Scaffolding frame according to claim 1 characterized in that the projections of a first set are aligned with corresponding projections of a second set in the axial direction of the joining sleeve.

6. Scaffolding frame according to claim 3 characterized in that the wings are stamped or folded out of the side wall of the joining sleeve.

7. Scaffolding frame according to claim 1 characterized in that at least one of the sets of peripheral expansion are formed as a peripheral support.

8. Scaffolding frame according to claim 1 characterized in that the U-shape spring of the safety bolt surrounds the vertical stand in the peripheral direction.

9. Scaffolding frame according to claim 1 characterized in that a spring of the safety bolt has a U-shape in the region opposite the safety bolt, the largest spacing of which from the outer periphery of the vertical stand being substantially equal to the length of the safety bolt.

10. Scaffolding frame according to claim 1 characterized in that the stop is formed as a section end piece partially closing of the vertical stand.

* * * * *

UNITED STATES PATENT AND TRADEMARK OFFICE
CERTIFICATE OF CORRECTION

PATENT NO. : 5,285,869
DATED : Feb. 15, 1994
INVENTOR(S) : Ernst Rück

It is certified that error appears in the above-indentified patent and that said Letters Patent is hereby corrected as shown below:

On the title page, item [73] Assignee, should read as follows:

--Oesterreichische Doka Schalungstechnik GmbH, Amstetten, Austria--.

Signed and Sealed this

Eighteenth Day of April, 1995

Attest:

BRUCE LEHMAN

*Attesting Officer*    *Commissioner of Patents and Trademarks*